Oct. 26, 1943.    R. A. RATCLIFF    2,332,752
FASTENING MEANS
Filed Nov. 9, 1940

Inventor
Ralph A. Ratcliff
By Paul O. Pippel
Atty.

Patented Oct. 26, 1943

2,332,752

UNITED STATES PATENT OFFICE 2,332,752

FASTENING MEANS

Ralph A. Ratcliff, Canton, Ill., assignor to International Harvester Company, a corporation of New Jersey Application November 9, 1940, Serial No. 364,967

4 Claims. (Cl. 287—20)

This invention relates to fastening means for the attaching of an attaching piece to a frame structure, and more particularly to a fastening means of a type adapted and arranged to be quickly interlocked with the parts being connected together. It has particular adaptation for the connection of agricultural tools adapted for connection to a tractor.

Heretofore, elongated slots or openings have been utilized in frame structures for the attaching thereto of a bolt having an enlarged head which is of such shape as to normally pass through the elongated opening or slot when the head thereof was disposed in registry with the opening in the frame structure. When this type of bolt is passed headwise through the opening in the frame structure, it is rotated about its axis so that the head will come out of registry with the openings and be retained within the slot or opening by the frame structure. With such bolt arrangements, it often becomes necessary that, in the fastening of an attaching piece to the frame structure, a pair of such bolts necessarily had to be used in order to prevent sliding movement within the elongated opening, one being used to prevent movement of the other. This sliding movement would very often take place particularly when the attaching piece had connected to it a part adapted to place great strain upon the attaching piece in the direction of elongation of the opening to which the attaching bolt was disposed.

It is an object of the present invention to provide means insertable into the remaining space of the opening and adapted to cooperate with the walls thereof for the purpose of preventing movement of the attaching bolt within the opening, once the attaching piece has been secured to the frame structure.

It is another object of the present invention to provide in such a means which is insertable a locking means for the bolt adapted to be inserted into the elongated slot which may include but a single part, and which is easily applied and automatically secured by the mere tightening of the bolt used for securing the attaching piece to the frame structure.

It is still another object of the invention to provide in a means for preventing lateral sliding movement of the attaching bolt within the slot in the frame structure, a means whereby the attaching piece will be retained not only against lateral movement but also against angular movement with respect to the frame structure.

According to the present invention, there has been provided a washer element having portions insertable within the remaining space of the opening in the frame structure whereby this space is positively filled, so that lateral movement of the bolt within the elongated opening is positively prevented. This washer element is slipped over the threaded portion of the bolt and includes the axially extending portions adapted to abut both sides of the bolt and the respective ends of the slots. The attaching piece has an opening therethrough for connection of the same to the threaded portion of the bolt. The washer element and the attaching piece are then clamped into position by a clamping nut.

In the modified form of the arrangement, the axially extending portions of the washer are of sufficient length so that the same will not only project into the opening within the frame structure, but also into a similar opening in the attaching piece. Since these locking portions of the washer element are interconnected, they will serve upon reacting against the walls of the respective openings in the attaching piece and in the frame structure to prevent angular movement of the attaching piece with respect to the frame structure.

For a better understanding of the invention, reference may be had to the following detailed description taken in conjunction with the accompanying drawing, in which.

Figure 2:
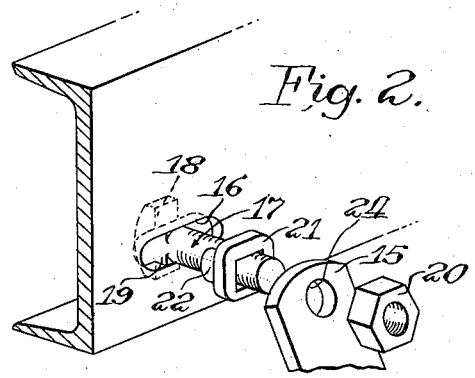
Figure 2 is an enlarged detail view, in perspective, illustrating the connection of the T-bolt and of the filler washer upon the attaching of the attaching piece to a frame structure.
Figure 3:
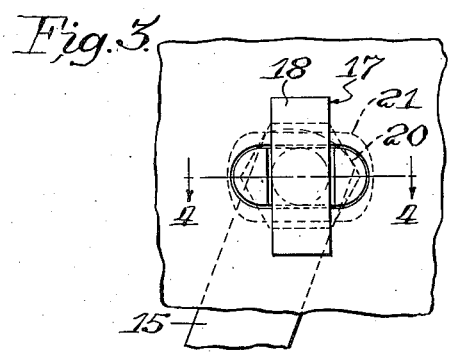
Figure 3 is an enlarged view in elevation looking at the rear of the frame structure and illustrating the registry of the enlarged head therewith.
Figure 5:
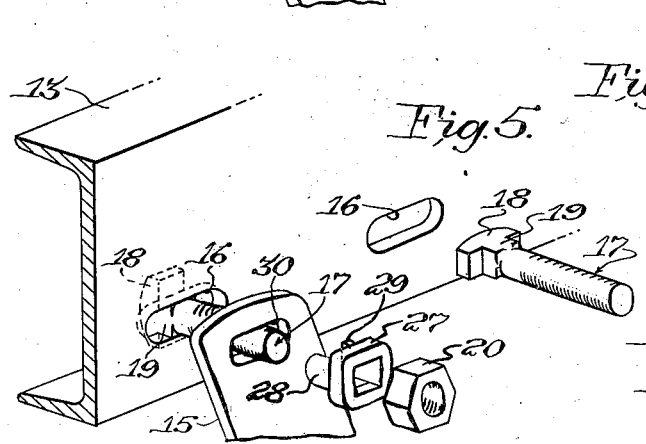
Figure 4:
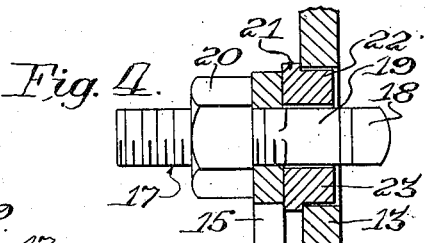

Figure 4 is a sectional view taken along the line 4—4 of Figure 3 of the entire assemblage of the fastening means and the parts being connected together; and, Figure 5 is a perspective view similar to Figure 2, but particularly illustrating a modified form of the washer element having axially extending portions of sufficient length to pass through not only the opening in the frame structure but also an opening in the attaching piece whereby the attaching piece will be retained against angular movement with respect to the frame structure.

Figure 1:
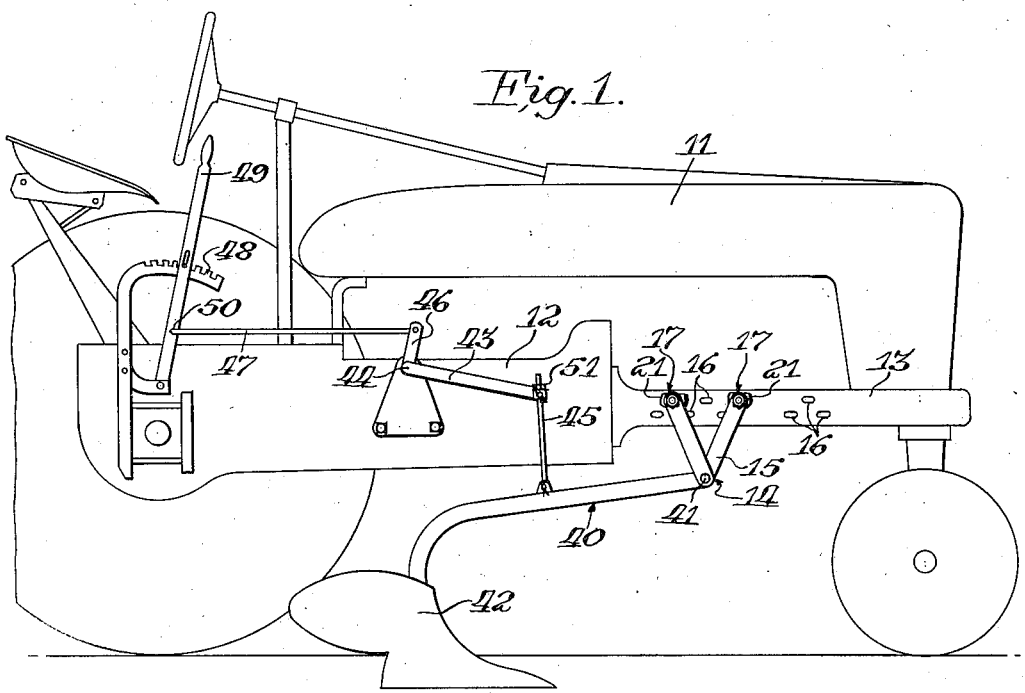
Figure 1 is a diagrammatic elevational view of a tractor having elongated slots therein and illustrating the connection of a bracket structure thereto, to which bracket structure there may be connected an agricultural implement for the purpose of being drawn by the tractor.

Referring now to Figure 1, there is shown a tractor 11 having a body structure 12 and a side frame structure 13, to which may be attached a bracket structure 14 including attaching pieces 15. To the lower end of the bracket structure 14 there may be attached any form of an implement which it may be desired to use with a tractor. The frame structure 13 may have a series of elongated slots 16 disposed longitudinally and at intervals along the length of the frame structure. The attaching pieces are connected to the frame structure 13 by a fastening means adapted to extend through the openings 16. These fastening means are of the enlarged head type, wherein the heads of the same are of such shape as to readily pass through the opening 16 when the heads are in registered relation with the openings. These attaching bolts are attachable to the frame structure from a location externally of the frame structure and from a position at the side of the tractor.

Referring now particularly to Figures 2, 3, and 4, there is shown in detail an attaching bolt 17 of this type having an enlarged head portion 18 of such shape as to permit the same to readily pass through an opening 16 when the head 18 is properly registered with the same. This registration is in effect when the head of the bolt is parallel with the opening 16, as illustrated in Figure 5. Once the head 18 has been inserted through the opening 16, the bolt is rotated so that the head portion 18 is brought out of registry with the opening 16. The head portion 18 then takes a position as shown more clearly in Figure 3 and at an angle with respect to the axis of elongation of the elongated opening 16.

The T-bolt 17 may also have, immediately following the enlarged head portion, a square portion 19 with sides having a length of approximately the diameter of the bolt, or of a length equivalent to the height of the opening 16. This squared portion 19 will serve after the bolt has been thrust through the opening and the head has been drawn against the bracket of the frame structure to prevent rotation of the bolt within the opening. The flat sides of the square portion running parallel with the upper and lower edges of the opening 16 will cooperate with the latter to prevent rotation of the bolt.

Coming now to the particular feature of the present invention, it will be noted that the elongated opening 16 is only partly filled by the bolt 17. Since this space permits movement of the bolt along the elongated opening, difficulty has arisen in that the bracket structures, when attached to the tractor, would not remain rigid with the frame structure 13 of the tractor, but would tend to slide along the length of the tractor. Unless two of such T-bolts were used, so as to have one of the bolts located at the forward end of its slot and a second bolt located at the rear end of its slot, it will be apparent that lateral movement would frequently occur upon any slight loosening of the clamping nut 20.

As a means for positively preventing lateral movement of the bolt within the opening 16, there has been provided a washer element 21 having axially extending filler portions 22 and 23 arranged to be disposed respectively at opposite sides of the T-bolt 17 to fill the remaining space within the opening 16. These axially extending filler portions 22 and 23 may take any shape such as will follow the contour of the ends of the opening 16. This element is slid along the bolt after the bolt has been angled into its connected position with the frame structure, and then the attaching piece 15 having an opening 24 is placed onto the attaching bolt 17. When the connection of the attaching piece has been made, the clamping nut 20 is then threaded onto the threaded portion of the bolt 17 and the parts can be brought into the assembled position shown particularly well in Figure 4. It should now be apparent that, with this washer element and its filler portions 22 and 23 located in the remaining space of the opening 16, any lateral movement of the bolt will be positively prevented. The washer element definitely serves as a locking means against lateral movement of the bolt 17 within the elongated opening 16.

Referring now to Figure 5, there is shown a washer element 27 similar to the washer element 21, but having axially extending filler portions 28 and 29 of greater length than the filler portions 22 and 23 of the element 21. These filler portions 28 and 29 are of greater length so as to also extend through an elongated opening 30 of the attaching piece 15. The elongated opening 30 is of similar dimension to the elongated opening 16 in the frame structure 13. When the attaching piece 15 is brought into its position for attachment to the frame structure 13, the opening 30 in the attaching piece is alined with the opening 16 in the frame structure. The washer 27 is then slid onto the threaded portion of the bolt 17 so that the portions 28 and 29, respectively, extend through both of the openings 30 and 16. A clamping nut 20 then fixes the assemblage so that the attaching piece 15 is held flush against the face of the frame structure 13. It should be apparent that, by having the filler portions extend through both openings, the filler element will not only serve to prevent lateral movement of the bolt within the opening 16, but also will serve to prevent angular movement of the attaching piece 15 with respect to the frame structure 13. Any tendency for the attaching piece 15 to angle with respect to the frame structure is thus resisted by the washer element 27.

The bracket means 14 including the attaching pieces 15 forms the attaching means of an implement structure indicated generally at 40. The implement structure 40 includes a tool beam pivotally connected at 41 to the bracket structure 14 and is adapted to extend rearwardly for the connection thereto of a ground-working tool 42. On the tractor, there is pivotally connected a bell crank lever 43 pivotable with respect thereto about a pivot 44. The forward end of the bell crank is connected to the implement beam by means of a lifting link 45. The other end of the bell crank lever 43 is connected to an adjusting mechanism 46 by means of a link 47. The adjusting mechanism includes the usual quadrant 48 and lever 49, to which the link 47 is connected at 50. The upper end of the lifting rod 45 is slidable with respect to the bell crank lever 43 when the working tool 42 is in its ground-working position. When it is desired to lift the working tool 42, the bell crank 43 is rotated in a counter-clockwise direction and one end thereof will contact with a collar 51 carried by the lift rod 45 through which the lifting force is imparted. When the working tool 42 is in its ground-working position, it will be prevented from going deeper into the soil by this same collar 51 on the lift rod 45.

While various changes may be made in the detail construction of the washer element embodying the features of the present invention, it should be understood that such changes shall be within the spirit and scope of the present invention as defined by the appended claims.

What is claimed is:

1. In combination, a tractor having an elongated opening, an implement structure including an attaching means for the attachment of the implement structure to the tractor, said attaching means having an elongated opening, means for fastening the implement attaching means to the tractor including a bolt having an elongated head adapted to pass through the elongated opening in the tractor and a portion extending through both of said openings but filling only a part of the opening space, a tightening nut on the bolt, means cooperating with both of the openings respectively of the attaching means and tractor for maintaining the attaching means against angular movement with respect to the tractor, and said bolt having a portion adapted to lie within the tractor opening for locking engagement therewith whereby the same will be retained against axial rotation when the nut is tightened.

2. In combination, a frame structure having an elonagted opening, an attaching frame piece having an elongated opening, bolt means for fastening the frame piece to the frame structure including a portion extending through both of said openings but filling only a part of the opening space, filler means extending through both of the openings and adapted to fill the remaining space to cooperate with the walls of the openings, whereby the attaching piece will be retained against both angular and lateral movement with respect to the frame structure, said fastening means having means adapted to lock with the opening in said frame structure whereby the fastening means is retained against rotative movement about an axis extending through the opening.

3. In combination, a frame structure having an elongated opening adapted to receive the enlarged held of a fastening bolt, an attaching piece adapted to be fastened to the frame structure and having an elongated opening, a bolt having an enlarged head and adapted, when the head is registered with the frame structure opening, to pass therethrough and to lock with the frame structure when rotated out of registry with such frame structure opening, a washer of which a portion is insertable into both of said openings and reacting against the walls thereof to retain the attaching piece against both angular and lateral movement with respect to the frame structure, and said bolt having formed thereon a portion abuttable against the washer to prevent rotation of the bolt relatively thereto, and said washer having thereon a part cooperable with the side walls of one of said openings to prevent substantial rotation of said washer and hence of the bolt within said openings.

4. In an attaching arrangement for securing together two members having respective transversely elongated openings axially and circumferentially registered to form counterparts of an opening means when said members are secured together, the combination of a bolt having a shank concurrently disposable in both opening means counterparts while leaving unfilled space at an end thereof and having a transversely elongated head passable through the opening means counterpart of one of said members only when disposed in circumferential alignment therewith, means disposable within said unfilled space to prevent relative rotation of the members circumferentially of the bolt, and means on said bolt cooperable with a side wall of said opening means to prevent rotation of the bolt about its axis relatively to said members.

RALPH A. RATCLIFF.